United States Patent
Kondo et al.

(10) Patent No.: US 7,917,086 B2
(45) Date of Patent: Mar. 29, 2011

(54) CHARGER, ELECTRONIC INSTRUMENT, AND CHARGING SYSTEM

(75) Inventors: Yoichiro Kondo, Chino (JP); Kuniharu Suzuki, Tokyo (JP); Hiroshi Kato, Yokohama (JP); Katsuya Suzuki, Takasaki (JP); Manabu Yamazaki, Hiratsuka (JP)

(73) Assignees: Seiko Epson Corporation, Tokyo (JP); Sony Ericsson Mobil Communications Japan Inc., Tokyo (JP)

( * ) Notice: Subject to any disclaimer, the term of this patent is extended or adjusted under 35 U.S.C. 154(b) by 628 days.

(21) Appl. No.: 12/071,146

(22) Filed: Feb. 15, 2008

(65) Prior Publication Data

US 2008/0200219 A1 Aug. 21, 2008

(30) Foreign Application Priority Data

Feb. 16, 2007 (JP) ................... 2007-036747

(51) Int. Cl.
*H04B 5/00* (2006.01)
(52) U.S. Cl. ............... 455/41.1; 455/41.2; 455/127.1; 455/572; 455/573; 320/108
(58) Field of Classification Search ............... 455/41.1, 455/41.2, 127.1, 572, 573; 320/108
See application file for complete search history.

(56) References Cited

U.S. PATENT DOCUMENTS

| 5,536,979 | A | * | 7/1996 | McEachern et al. | 307/104 |
| 5,771,438 | A | * | 6/1998 | Palermo et al. | 455/41.1 |
| 5,952,814 | A | * | 9/1999 | Van Lerberghe | 320/108 |
| 6,016,046 | A | * | 1/2000 | Kaite et al. | 320/108 |
| 6,462,509 | B1 | * | 10/2002 | Abe et al. | 320/108 |

FOREIGN PATENT DOCUMENTS

| JP | A 06-303726 | 10/1994 |
| JP | A 06-311659 | 11/1994 |
| JP | A-07-177667 | 7/1995 |
| JP | A-07-231586 | 8/1995 |
| JP | A 07-322534 | 12/1995 |
| JP | A-2000-217279 | 8/2000 |
| JP | A-2001-258182 | 9/2001 |
| JP | A-2002-017046 | 1/2002 |
| JP | A-2002-055176 | 2/2002 |
| JP | A-2005-006441 | 1/2005 |
| JP | A-2006-059979 | 3/2006 |
| JP | A-2006-102055 | 4/2006 |

* cited by examiner

*Primary Examiner* — Sanh D Phu
(74) *Attorney, Agent, or Firm* — Oliff & Berridge, PLC

(57) ABSTRACT

A charger and an electronic instrument include a planar air-core coil, a magnetic sheet disposed on a side of the planar air-core coil that is opposite to a transmission side, and a housing disposed at a position that faces the transmission side of the planar air-core coil. The housing includes a positioning protrusion that is formed on an inner surface of the housing and positions the planar air-core coil, and a positioning protrusion or a positioning depression formed by an outer surface.

19 Claims, 6 Drawing Sheets

CHARGER, ELECTRONIC INSTRUMENT, AND CHARGING SYSTEM

Japanese Patent Application No. 2007-36747 filed on Feb. 16, 2007, is hereby incorporated by reference in its entirety.

BACKGROUND OF THE INVENTION

The present invention relates to a charger relating to non-contact power transmission using a coil, an electronic instrument, a charging system, and the like.

Non-contact power transmission which utilizes electromagnetic induction to enable power transmission without metal-to-metal contact has been known. As application examples of non-contact power transmission, charging a portable telephone, a household appliance (e.g., telephone handset), and the like has been proposed.

In power transmission utilizing electromagnetic induction, the amount of deviation of a coil from the coaxial line affects the amount of power transmission to a large extent. Therefore, it is important that a charging target be placed at an appropriate position of a charger. The following technologies have been proposed aiming at appropriately positioning a charging target with respect to a charger.

JP-A-6-311659 discloses technology which prevents insertion of a foreign object between a charging target and a charger so that charging occurs at an appropriate position.

JP-A-7-322534 discloses electromagnetic coupling technology in which a protruding core is inserted into an air-core solenoid coil.

JP-A-6-303726 discloses technology which produces primary/secondary electromagnetic coupling by inserting a primary-side core into an air-core section of a secondary-side coil.

The above documents disclose technologies in which a core is provided in a coil.

SUMMARY

According to one aspect of the invention, there is provided a charger that charges an electronic instrument, the charger comprising:

a planar air-core coil that has an air-core section;

a magnetic sheet disposed on a side of the planar air-core coil, the side being opposite to a transmission side of the planer air-core coil; and a housing that is disposed at a position that faces the transmission side of the planar air-core coil, the housing including:

a coil positioning protrusion that is formed on an inner surface of the housing and positions the planar air-core coil; and a positioning section that positions the electronic instrument.

According to another aspect of the invention, there is provided an electronic instrument that is charged using a charger, the electronic instrument comprising:

a planar air-core coil that has an air-core section;

a magnetic sheet disposed on a side of the planar air-core coil, the side being opposite to a transmission side of the planer air-core coil; and a housing that is disposed at a position that faces the transmission side of the planar air-core coil, the housing including:

a coil positioning protrusion that is formed on an inner surface of the housing and positions the planar air-core coil; and a positioning target section, the electronic instrument being positioned on the charger using the positioning target section.

According to another aspect of the invention, there is provided a charging system comprising:

the above charger; and the above electronic instrument, the electronic instrument and the charger being positioned by fitting the positioning section of the charger to engage the positioning target section of the electronic instrument.

DETAILED DESCRIPTION OF THE EMBODIMENT

Figure 1:
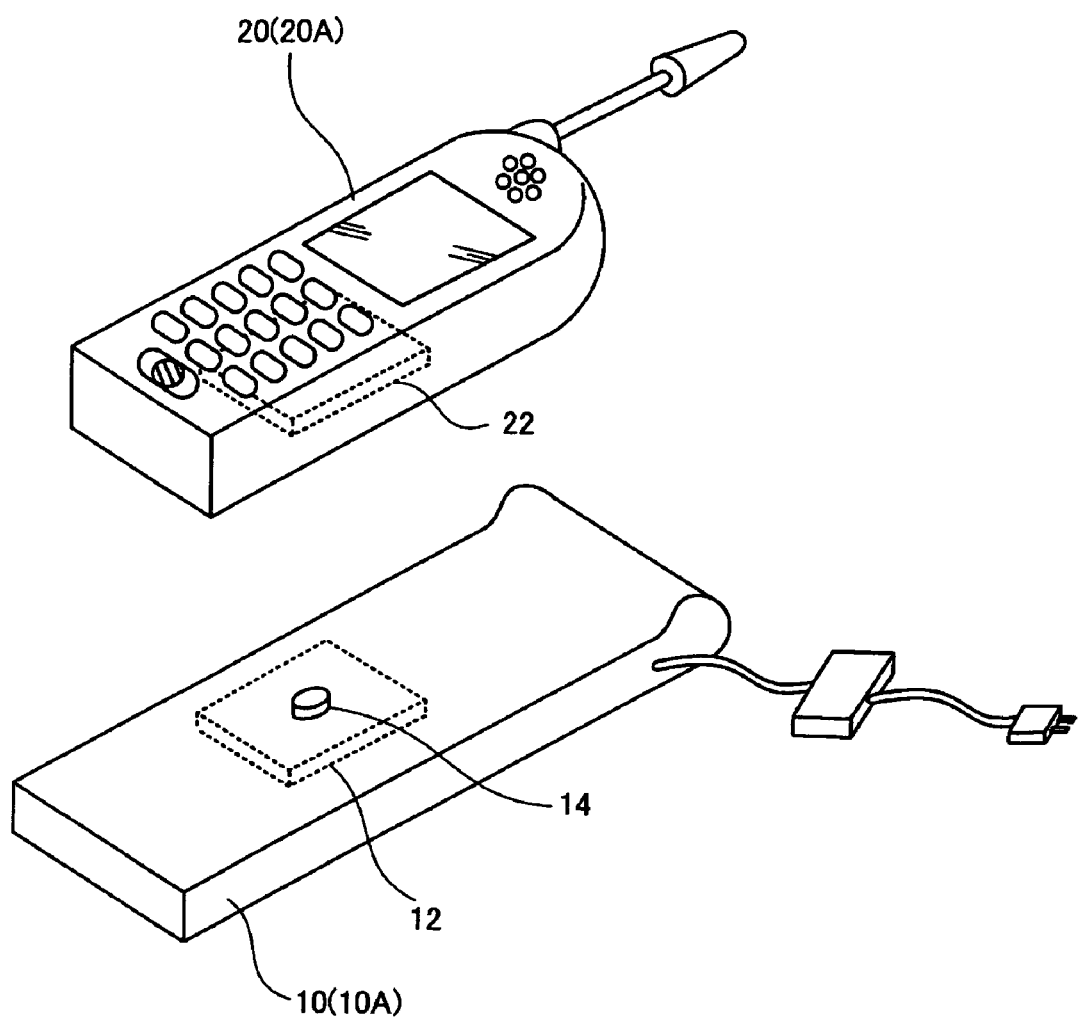
FIG. 1 is a view showing a first embodiment having a charger and a portable telephone horizontally placed on the charger.

Some aspects of the invention may provide a charger, an electronic instrument, and a charging system with improved transmission efficiency.

According to one embodiment of the invention, there is provided a charger that charges an electronic instrument, the charger comprising:

a planar air-core coil that has an air-core section;

a magnetic sheet disposed on a side of the planar air-core coil, the side being opposite to a transmission side of the planer air-core coil; and a housing that is disposed at a position that faces the transmission side of the planar air-core coil, the housing including:

a coil positioning protrusion that is formed on an inner surface of the housing and positions the planar air-core coil; and a positioning section that positions the electronic instrument.

In the charger according to one embodiment of the invention, the planar air-core coil is uniquely positioned inside the housing utilizing the coil positioning protrusion. The positioning section formed on the housing allows the electronic instrument charged using the charger to be positioned with respect to the charger. A coil is also provided in the electronic instrument. The electronic instrument can be placed on the charger so that the coils are located at an appropriate position, whereby transmission efficiency can be increased. Since the magnetic sheet is provided on the side of the planar air-core coil opposite to the transmission side through which charging power is transmitted, inductance can be increased.

In the charger, the coil positioning protrusion may be inserted into the air-core section of the planar air-core coil to position the planar air-core coil, or may position the periphery of the planar air-core coil.

According to this configuration, since the planar air-core coil is positioned utilizing the shape of the planar air-core coil, it is unnecessary to additionally form a positioning section on the planar air-core coil. Therefore, it is unnecessary to process the planar air-core coil. This prevents a situation in which the function of the planar air-core coil is adversely affected or the degree of freedom relating to the design of the planar air-core coil decreases.

In the charger, the positioning section may protrude outward from an outer surface of the housing at a position that corresponds to a center position of the air-core section of the planar air-core coil.

This makes it easy to place the charger and the electronic instrument so that the center of the air-core section of the planar air-core coil coincides with the transmission center axis irrespective of the installation angle in the plane where the charger faces the electronic instrument, whereby a constant transmission efficiency can be ensured.

In the charger, the positioning section may have one or more protruding sections inside the air-core section of the planar air-core coil.

According to this configuration, a foreign object cannot enter the space between the charger and the electronic instrument to cover the entire position at which the magnetic flux density is highest (i.e., position opposite to the air-core section) due to the presence of the positioning section.

In the charger, the positioning section may be a depression that guides the electronic instrument. The depression enables the electronic instrument to be guided to a charging position.

In the charger, the depression may have guiding surfaces, a distance between the guiding surfaces decreasing toward a bottom of the depression. This allows the electronic instrument to be guided to a predetermined charging position due to its weight or the like.

In the charger, a thermistor may be disposed in the air-core section. A thermistor may be disposed on the surface of the positioning section. In either case, the thermistor and a circuit may be connected through two parallel connection lines that are provided in parallel to a diametrical direction of the coil.

According to another embodiment of the invention, there is provided an electronic instrument that is charged using a charger, the electronic instrument comprising:

a planar air-core coil that has an air-core section;

a magnetic sheet disposed on a side of the planar air-core coil, the side being opposite to a transmission side of the planer air-core coil; and a housing that is disposed at a position that faces the transmission side of the planar air-core coil, the housing including:

a coil positioning protrusion that is formed on an inner surface of the housing and positions the planar air-core coil; and a positioning target section, the electronic instrument being positioned on the charger using the positioning target section.

In the electronic instrument according to this embodiment of the invention, the planar air-core coil is uniquely positioned inside the housing utilizing the coil positioning protrusion. The electronic instrument is placed in a state in which the positioning target section of the housing is positioned with respect to the charger which charges the electronic instrument. A coil is also provided in the charger. The electronic instrument can be placed on the charger so that the coils are located at an appropriate position, whereby transmission efficiency can be increased. Since the magnetic sheet is provided on the side of the planar air-core coil opposite to the transmission side through which charging power is transmitted, inductance can be increased.

In the electronic instrument, the coil positioning protrusion may be inserted into the air-core section of the planar air-core coil to position the planar air-core coil, or may position the periphery of the planar air-core coil. Therefore, the planar air-core coil can be positioned utilizing the shape of the planar air-core coil in the same manner as in the above-described charger.

In the electronic instrument, the positioning target section may be a positioning depression that is formed in a placement side of the housing that is placed on the charger, and the electronic instrument may be positioned with respect to the charger using the positioning depression. Moreover, since the positioning depression of the electronic instrument need not be caused to protrude from the outer surface, portability can be ensured even if the electronic instrument is a portable instrument.

In the electronic instrument, the positioning depression may be disposed to coincide with the centerline of the air-core section of the planar air-core coil. Therefore, transmission efficiency can be further increased in the same manner as in the above-described charger.

In the electronic instrument, the positioning target section may be formed by a shape of part of the housing that is placed on the charger, and the part of the housing may be positioned with respect to the charger.

The electronic instrument may further include a magnetic shielding sheet, the magnetic shielding sheet being provided on a side of the magnetic sheet that is opposite to that is positioned on the planar air-core coil.

This enables a magnetic flux which cannot be absorbed by the magnetic sheet or leaks from the magnetic sheet to be absorbed, thereby preventing a problem in which a metal of a board or the like positioned on the inner side of the housing with respect to the magnetic sheet undergoes induction heating.

According to another embodiment of the invention, there is provided a charging system comprising: the above charger; and the above electronic instrument, the electronic instrument and the charger being positioned by fitting the positioning section of the charger to engage the positioning target section of the electronic instrument. Since the electronic instrument is placed on the charger while positioning the electronic instrument with respect to the charger in this manner, the electronic instrument can be placed on the charger so that the coils are located at an appropriate position, whereby transmission efficiency can be increased.

In the charging system, the magnetic sheet of the electronic instrument may have a size equal to or larger than an external shape of the planar air-core coil of the charger. This prevents a situation in which a metal provided in the electronic instrument undergoes eddy current loss, whereby power transmission efficiency can be increased, and malfunction due to an eddy current can be prevented.

Preferred embodiments of the invention are described in detail below. Note that the embodiments described below do not in any way limit the scope of the invention defined by the claims laid out herein. Note that all elements of the embodiments described below should not necessarily be taken as essential requirements for the invention.

1. First Embodiment

Figure 2:
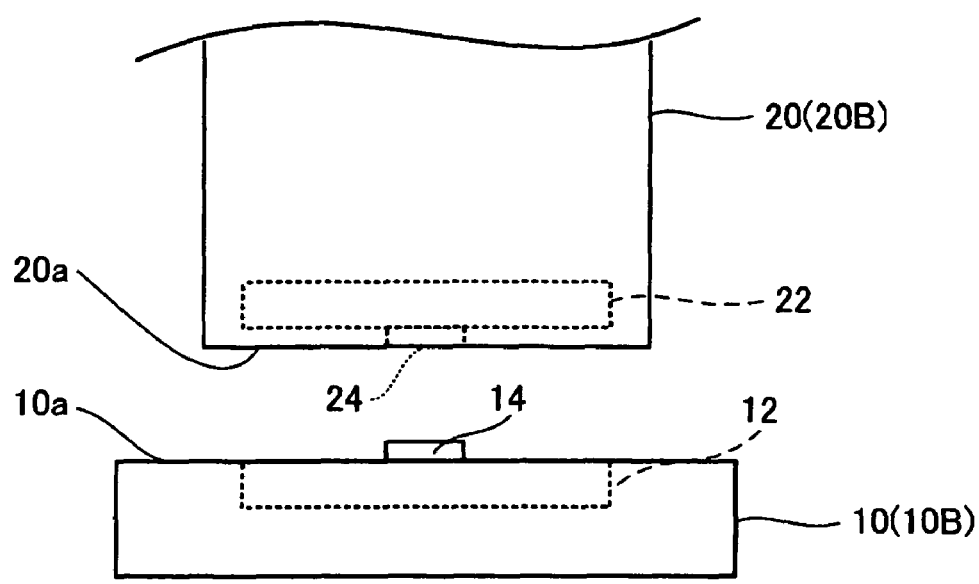
FIG. 2 is a view showing a modification of a first embodiment having a charger and a portable telephone vertically placed on the charger.

FIGS. 1 and 2 are views schematically showing a charger 10 and an electronic instrument (e.g., portable telephone 20) which is charged using the charger 10. FIG. 1 shows a portable telephone 20A which is horizontally placed on a charger 10A. The portable telephone 20A is charged using the charger 10A by non-contact power transmission utilizing electromagnetic induction which occurs between a coil of a coil unit 12 of the charger 10A and a coil of a coil unit 22 of the portable telephone 20A.

The portable telephone 20A is placed on the charger 10A in a state in which a positioning depression (positioning target section in a broad sense) 24 (not shown in FIG. 1; see FIG. 3) is positioned with respect to a positioning protrusion 14 (positioning section in a broad sense) of the charger 10A. Since the portable telephone 20A is placed on the charger 10A while positioning the positioning depression with respect to the positioning protrusion 14, the portable telephone 20A can be placed at an appropriate position of the charger 10A, whereby transmission efficiency can be increased.

FIG. 2 shows an example of a positioning structure for a portable telephone 20B which is vertically placed on a charger 10B. The charger 10B includes a positioning protrusion 14 (positioning section in a broad sense) which protrudes outward from the outer surface of a housing 10a of the charger 10B. The portable telephone 20 includes a positioning depression 24 (positioning target section in a broad sense) formed in the outer surface of a housing 20a of the portable telephone 20. The positioning depression 24 is fitted into the positioning protrusion 14 so that the portable telephone 20 is positioned with respect to the charger 10. This allows the coil unit 22 of the portable telephone 20 to be disposed at a position at which the coil unit 22 faces the coil unit 12 of the charger 10.

The cross-sectional shape of the positioning protrusion 14 may be columnar, square, polygonal, or the like. It suffices that the positioning protrusion 14 have a protruding shape which is fitted into the positioning depression 24. When the positioning protrusion 14 has a columnar cross-sectional shape, a regular polygonal cross-sectional shape square, or the like, the portable telephone 20 may be placed on the charger 10 at an arbitrary angle. On the other hand, when the coils of the coil units 12 and 22 are circular and the center of each of the positioning depression 24 and the positioning protrusion 14 coincides with a transmission center axis A10 (see FIG. 3), a constant transmission efficiency can be maintained irrespective of the placement angle, as described later. Moreover, mispositioning due to the operation of a vibrator of a portable telephone or the like can be prevented utilizing the positioning depression/protrusion mechanism.

It is possible to prevent connection between the charger 10 and the portable telephone 20 conforming to different standards by changing the shape of the positioning protrusion 14 and the positioning depression 24 according to the power transmission standard. For example, a 5 V/500 mA standard can be discriminated from a 5 V/200 mA standard by changing the shape of the positioning protrusion 14 and the positioning depression 24. When an electronic instrument which conforms only to a 5 V/200 mA standard is placed on a charger which conforms to a 5 V/500 mA standard, unexpected current flows without a current limit circuit. According to this embodiment, an electronic instrument conforming to a different standard cannot be fitted into the charger by changing the shape of the positioning protrusion 14 and the positioning depression 24.

Figure 3:
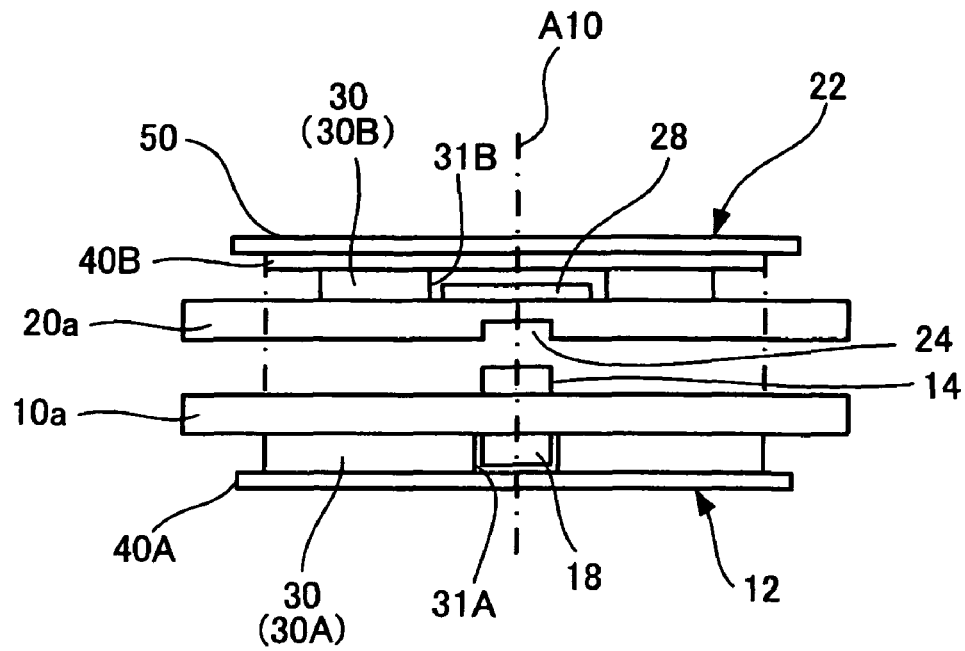
FIG. 3 is an enlarged view showing a positioning protrusion and a positioning depression.

FIG. 3 shows the coil units 12 and 22. The coil units 12 and 22 respectively include planar air-core coils 30A and 30B. The coils 30A and 30B are collectively referred to as a coil 30. The planar air-core coils 30A and 30B are not particularly limited insofar as the coils 30A and 30B are flat (planar) air-core coils having air-core sections 31A and 31B. For example, an air-core coil formed by winding a single-core or multi-core coated coil wire in a plane may be used as the planar air-core coils 30A and 30B. The diameter of the planar air-core coil 30A of the charger 10 is larger than the diameter of the planar air-core coil 30B of the portable telephone 20. The diameter of the air-core section 31A of the planar air-core coil 30A is smaller than the diameter of the air-core section 31B of the planar air-core coil 30B.

Housings 10a and 20a of the coil units 12 and 22 are respectively provided with coil positioning protrusions 18 and 28 which protrude inward. The planar air-core coils 30A and 30B are positioned by inserting the coil positioning protrusions 18 and 28 into the air-core sections 31A and 31B. According to this embodiment, the center positions of the positioning protrusion 14 and the positioning depression 24 coincide with the center positions of the air-core sections 31A and 30B of the planar air-core coils 30A and 31B. These center positions coincide with the transmission center axis A10 upon attachment. This ensures a constant transmission efficiency irrespective of the angle of the portable telephone with respect to the charger 10 in the placement plane of the charger 10, as described above.

The diameters of the positioning protrusion 14 and the positioning depression 24 may be substantially equal to or smaller than the diameter of the air-core section 31A of the planar air-core coil 30A. If a foreign object such as a metal is located at a position opposite to the positioning depression 24, the portable telephone 20 cannot be normally placed on the charger 10. In such a case, the foreign object will be removed. Accordingly, when a foreign object exists between the charger 10 and the portable telephone 20, the foreign object exists at a position differing from the position of the positioning depression 24. Since the coil air-core section 31A has a high magnetic flux density, when a metal foreign object exists so that the coil air-core section 31A is covered therewith, a flux linkage to the foreign object increases, whereby the metal foreign object produces heat due to an eddy current. The amount of heat produced by the metal foreign object due to an eddy current can be reduced to a large extent by providing one or more positioning protrusions 14 having a diameter equal to or smaller than the diameter of the coil air-core section 31A.

Figure 4:
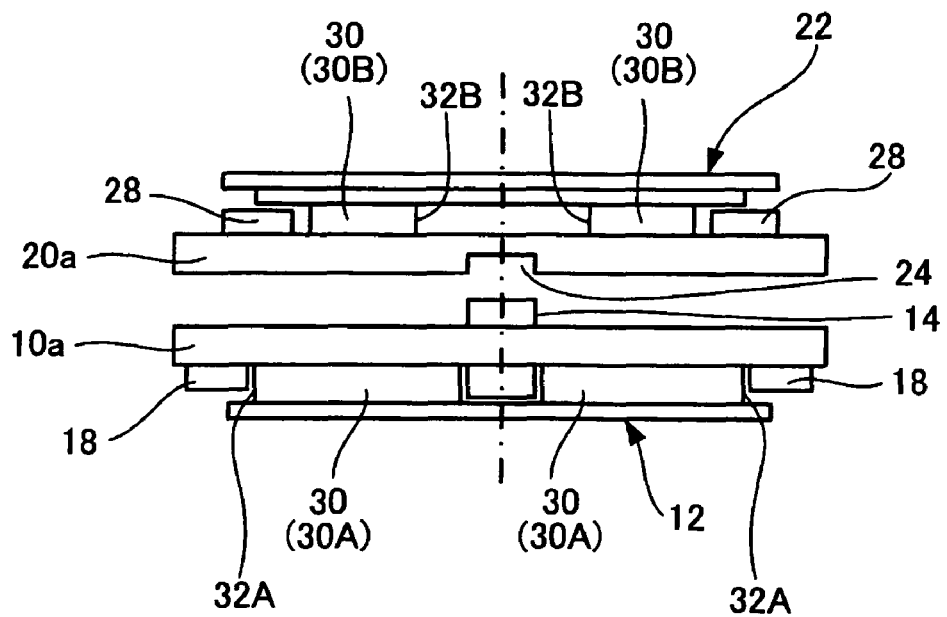
FIG. 4 is a view showing a modification of a positioning protrusion and a positioning depression.

Note that the coil positioning protrusions 18 and 28 may be positioned with respect to peripheries 32A and 32B of the planar air-core coils 30A and 30B (see FIG. 4). In this case, the coil positioning protrusions 18 and 28 are formed in the shape of a ring, or three or more coil positioning protrusions are disposed around the peripheries 32A and 32B of the planar air-core coils 30A and 30B.

As shown in FIG. 3, magnetic sheets 40A and 40B are respectively provided on the planar air-core coils 30A and 30B, each magnetic sheet being provided on the side opposite to the transmission side (side of the housings 10a and 20a). The magnetic sheets 40A and 40B receive a magnetic flux from the planar air-core coils 30A and 30B and increase the inductances of the planar air-core coils 30A and 30B. A soft magnetic material is preferably used as the material for the magnetic sheets 40A and 40B. A soft magnetic ferrite material or a soft magnetic metal material may be used as the material for the magnetic sheets 40A and 40B.

In the coil unit 22 of the portable telephone 20, a magnetic flux leakage prevention member 50 may optionally be provided on the side of the magnetic sheet 40B opposite to the side which faces the air-core planar coil 30B. The magnetic flux leakage prevention member 50 absorbs a magnetic flux which cannot be absorbed by the magnetic sheet 40B or leaks from the magnetic sheet 40B. This prevents an adverse effect of a magnetic flux on the components provided in the portable telephone 20. The material for the magnetic flux leakage prevention member 50 is not particularly limited insofar as the material can absorb a magnetic flux. For example, a non-magnetic material such as aluminum may be used as the material for the magnetic flux leakage prevention member 50.

The transmission characteristics are affected by a member (e.g., metal) positioned close to or in contact with the magnetic sheet 40B. Therefore, it is preferable to specify the material and size of the magnetic flux leakage prevention member 50 depending on the desired transmission characteristics.

Figure 5:
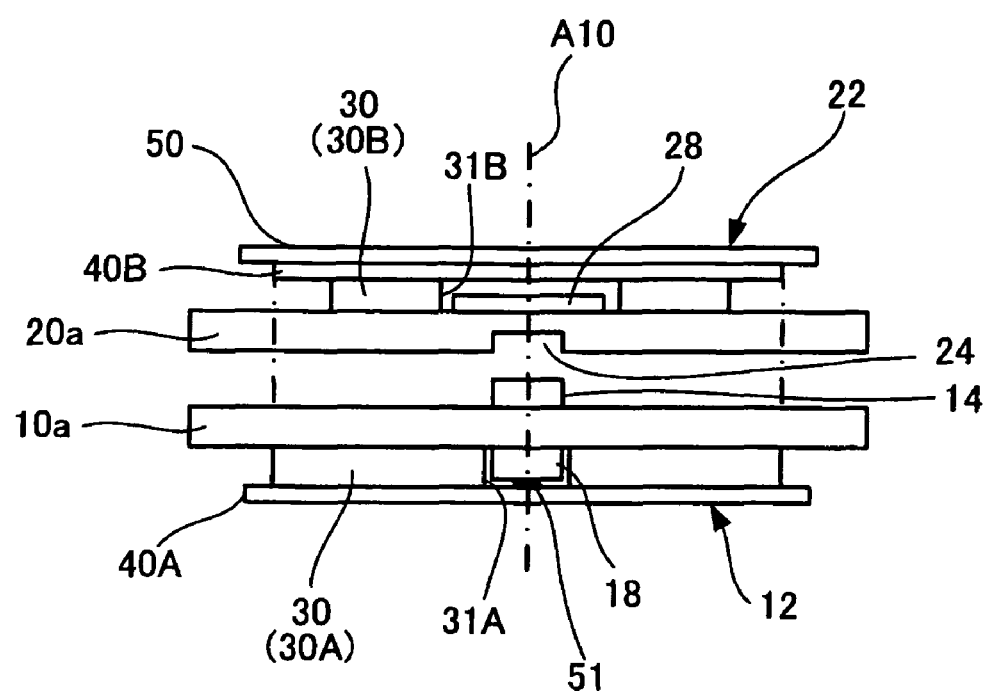
FIG. 5 is a view showing a modification of a coil unit.

FIG. 5 shows a modification of the coil unit. In FIG. 5, the same sections as in FIG. 3 are indicated by the same symbols. Reference numeral 51 indicates a thermistor disposed in the air-core section 31A. The thermistor 51 detects heat produced from a metal erroneously inserted between the positioning protrusion 14 and the positioning depression 24 during power transmission due to electromagnetic induction. The thermistor 51 is connected to a circuit which controls power transmission. The circuit stops power transmission when the metal produces heat. It is desirable that a circuit pattern or a lead that is connected to the thermistor 51 be provided so that two parallel lines are provided at a short interval in parallel to the diametrical direction of the coil in order to suppress the effect of a magnetic flux produced by the coils 30A and 30B.

In the above embodiments, the positioning protrusion of the charger may be a positioning depression, and the thermistor may be disposed on the surface of the positioning depression. In this case, the positioning section of the electronic instrument is formed as a positioning protrusion. The thermistor may be disposed on the outer surface of the housing (e.g., positioning protrusion). In this case, heat generation from the metal can be accurately detected. The thermistor may also be disposed on or near the positioning section of the electronic instrument.

Figure 6A:
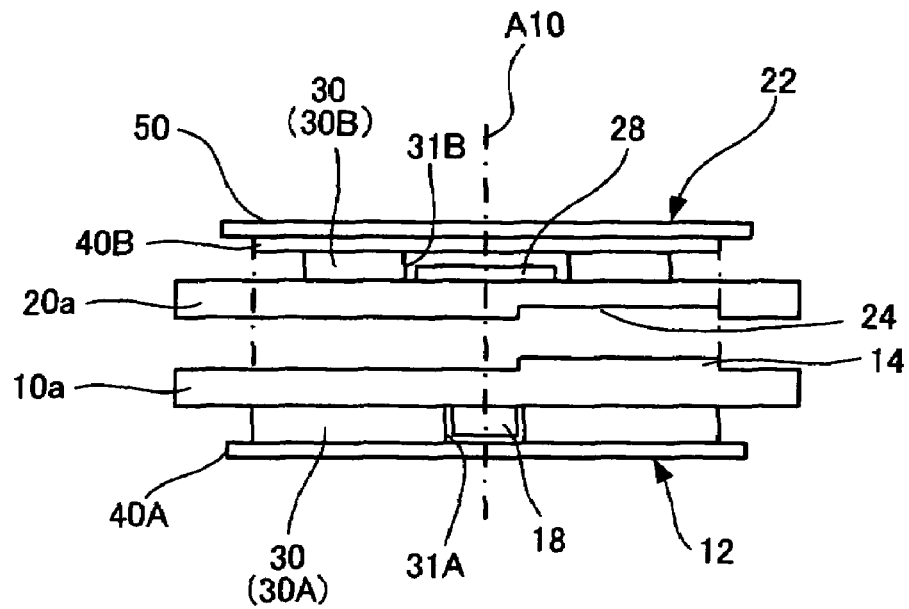
FIGS. 6A and 6B are views showing another modification of a coil unit.
Figure 6B:
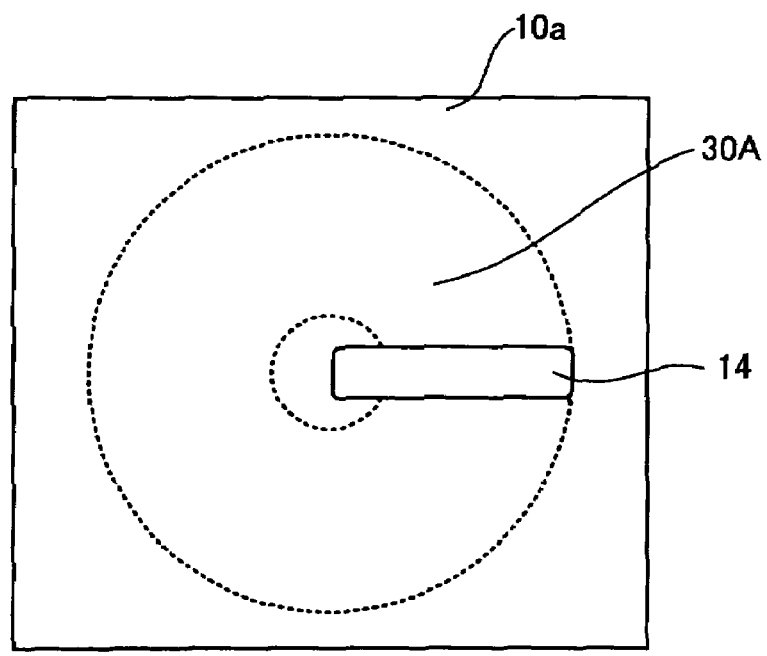

FIGS. 6A and 6B show another modification of the coil unit. FIG. 6B is a partial view showing the housing 10a shown in FIG. 6A from above. In FIGS. 6A and 6B, the same sections as in FIG. 3 are indicated by the same symbols. A ring-shaped metal foreign object can be removed using such a positioning mechanism.

2. Second Embodiment

Figure 7:
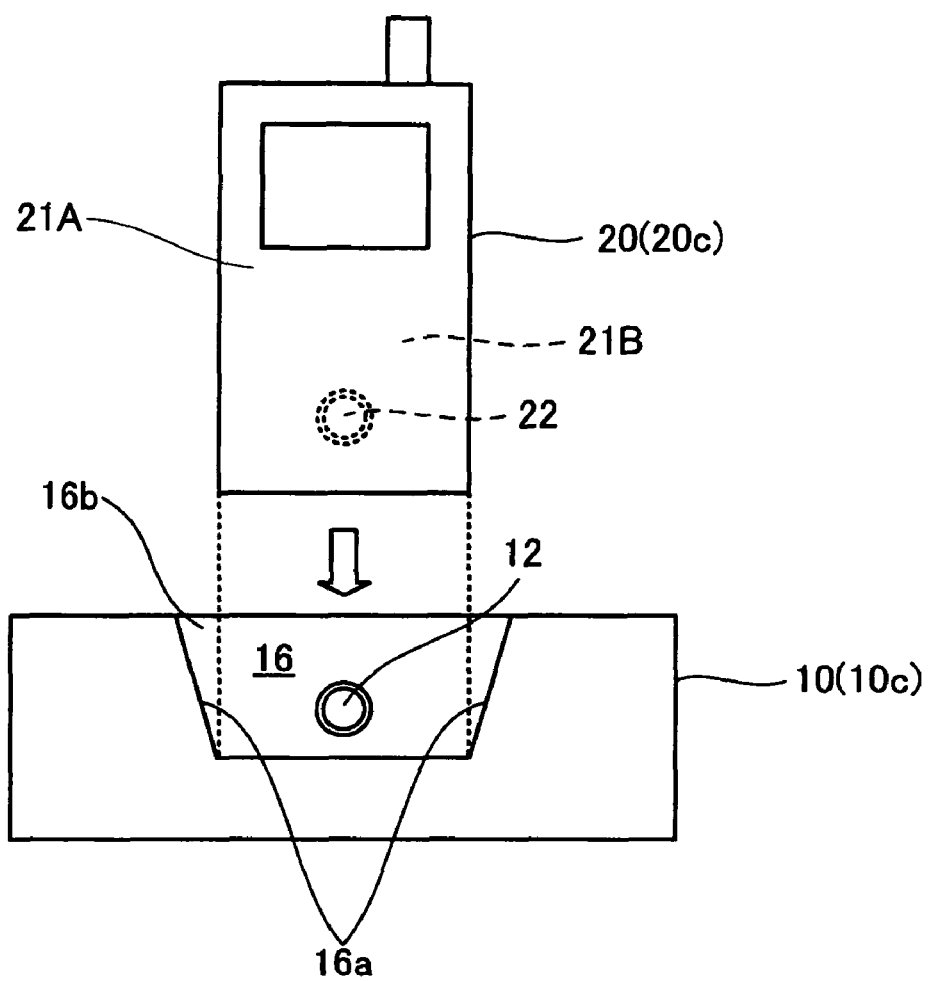
FIG. 7 is a view illustrative of a second embodiment.

FIG. 7 is a view illustrative of a second embodiment of the invention.

In the second embodiment, a positioning depression (positioning section in a broad sense) 16 which vertically receives a portable telephone 20C is formed in the housing 10a of the charger 10C.

A side surface 16a of the positioning depression 16 is formed as a guiding surface which guides the portable telephone 20C to a given charging position. The positioning depression 16 becomes narrower toward the bottom. This allows the portable telephone to be guided to a given charging position due to its weight.

In the second embodiment, the configurations of the coil units 12 and 22 described relating to the first embodiment may also be applied. Note that the coil unit 22 is disposed near a back side 21B opposite to a front side 21A where the portable telephone 20C has an operation panel and a display section. The coil unit 12 is disposed near a side 16b differing from guiding sides 16a of the positioning depression 16 of a charger 10C.

According to the second embodiment, the positioning depression 24 shown in FIGS. 2 and 3 need not be formed in the housing 20a of the portable telephone 20C. The housing 20a of the portable telephone 20C serves as the positioning target section. The positioning depression 16 is formed in the charger 10C instead of the positioning protrusion 14 provided in the first embodiment. Therefore, the positioning target section of the housing 20a of the electronic instrument 20 may have a shape corresponding to the shape of the positioning section of the charger 10 (i.e., positioning protrusion 14 (first embodiment) or positioning depression 16 (second embodiment)).

3. Application Example of Electronic Instrument

The above embodiments may be applied to an electronic instrument which performs power transmission or signal transmission. For example, the above embodiments may be applied to a charging target including a secondary battery (e.g., wristwatch, electric toothbrush, electric shaver, cordless telephone, personal handyphone, mobile personal computer, personal digital assistant (PDA), or power-assisted bicycle) and a charger.

Although only some embodiments of the invention have been described in detail above, those skilled in the art would readily appreciate that many modifications are possible in the embodiments without materially departing from the novel teachings and advantages of the invention. Accordingly, such modifications are intended to be included within the scope of the invention. Any term cited with a different term having a broader meaning or the same meaning at least once in the specification and the drawings can be replaced by the different term in any place in the specification and the drawings.

The above embodiments have been described taking an example relating to non-contact power transmission. Note that the invention may be similarly applied to non-contact signal transmission utilizing an electromagnetic induction principle.

Although only some embodiments of the invention have been described in detail above, those skilled in the art would readily appreciate that many modifications are possible in the embodiments without materially departing from the novel teachings and advantages of the invention. Accordingly, such modifications are intended to be included within the scope of the invention.

What is claimed is:

1. A charger that charges an electronic instrument, the charger comprising:
   a planar air-core coil that has an air-core section;
   a magnetic sheet disposed on a side of the planar air-core coil, the side being opposite to a transmission side of the planer air-core coil; and
   a housing that is disposed at a position that faces the transmission side of the planar air-core coil,
   the housing including:
   a coil positioning protrusion that is formed on an inner surface of the housing and positions the planar air-core coil; and
   a positioning section that positions the electronic instrument.

2. The charger as defined in claim 1,
   the coil positioning protrusion being inserted into the air-core section of the planar air-core coil to position the planar air-core coil.

3. The charger as defined in claim 1,
   the coil positioning protrusion positioning a periphery of the planar air-core coil.

4. The charger as defined in claim 1,
   the positioning section protruding outward from an outer surface of the housing at a position that corresponds to a center position of the air-core section of the planar air-core coil.

5. The charger as defined in claim 4,
   the positioning section having one or more protruding sections inside the air-core section of the planar air-core coil.

6. The charger as defined in claim 1,
the positioning section being a depression that guides the electronic instrument.

7. The charger as defined in claim 6,
the depression having guiding surfaces, a distance between the guiding surfaces decreasing toward a bottom of the depression.

8. The charger as defined in claim 1, further including:
a thermistor that is disposed in the air-core section.

9. The charger as defined in claim 1, further including:
a thermistor that is disposed on a surface of the positioning section.

10. The charger as defined in claim 8,
the thermistor and a circuit being connected through two parallel connection lines that are provided in parallel to a diametrical direction of the coil.

11. An electronic instrument that is charged using a charger, the electronic instrument comprising:
a planar air-core coil that has an air-core section;
a magnetic sheet disposed on a side of the planar air-core coil, the side being opposite to a transmission side of the planer air-core coil; and
a housing that is disposed at a position that faces the transmission side of the planar air-core coil,
the housing including:
a coil positioning protrusion that is formed on an inner surface of the housing and positions the planar air-core coil; and
a positioning target section, the electronic instrument being positioned on the charger using the positioning target section.

12. The electronic instrument as defined in claim 11,
the coil positioning protrusion being inserted into the air-core section of the planar air-core coil to position the planar air-core coil.

13. The electronic instrument as defined in claim 11,
the coil positioning protrusion positioning a periphery of the planar air-core coil.

14. The electronic instrument as defined in claim 11,
the positioning target section being a positioning depression that is formed in a placement side of the housing that is placed on the charger, and the electronic instrument being positioned with respect to the charger using the positioning depression.

15. The electronic instrument as defined in claim 14,
the positioning depression being disposed at a position that corresponds to a center position of the air-core section of the planar air-core coil.

16. The electronic instrument as defined in claim 11,
the positioning target section being formed by a shape of part of the housing that is placed on the charger, and the part of the housing being positioned with respect to the charger.

17. The electronic instrument as defined in claim 11, further including:
a magnetic shielding sheet, the magnetic shielding sheet being provided on a side of the magnetic sheet that is opposite to that is positioned on the planar air-core coil.

18. A charging system comprising:
the charger as defined in claim 1; and
an electronic instrument that is charged using a charger, the electronic instrument comprising:
a planar air-core coil that has an air-core section;
a magnetic sheet disposed on a side of the planar air-core coil, the side being opposite to a transmission side of the planer air-core coil; and
a housing that is disposed at a position that faces the transmission side of the planar air-core coil,
the housing including:
a coil positioning protrusion that is formed on an inner surface of the housing and positions the planar air-core coil; and
a positioning target section, the electronic instrument being positioned on the charger using the positioning target section,
the electronic instrument and the charger being positioned by fitting the positioning section of the charger to engage the positioning target section of the electronic instrument.

19. The charging system as defined in claim 18,
the magnetic sheet of the electronic instrument having a size equal to or larger than an external shape of the planar air-core coil of the charger.

* * * * *

UNITED STATES PATENT AND TRADEMARK OFFICE
CERTIFICATE OF CORRECTION

PATENT NO. : 7,917,086 B2
APPLICATION NO. : 12/071146
DATED : March 29, 2011
INVENTOR(S) : Yoichiro Kondo et al.

Page 1 of 1

It is certified that error appears in the above-identified patent and that said Letters Patent is hereby corrected as shown below:

On the Title Pg.

Please delete the following:

Item (73) Assignees: Seiko Epson Corporation, Tokyo (JP);
Sony Ericsson Mobil Communications Japan Inc., Tokyo (JP)

And replace with:

Item (73) Assignees: Seiko Epson Corporation, Tokyo (JP);
Sony Ericsson Mobile Communications Japan Inc., Tokyo (JP)

Signed and Sealed this
Third Day of January, 2012

David J. Kappos
*Director of the United States Patent and Trademark Office*